Sept. 5, 1939.　　　A. HOLLANDER ET AL　　　2,171,749
SUBMERSIBLE MOTOR ASSEMBLY
Filed Dec. 8, 1937　　　2 Sheets-Sheet 1
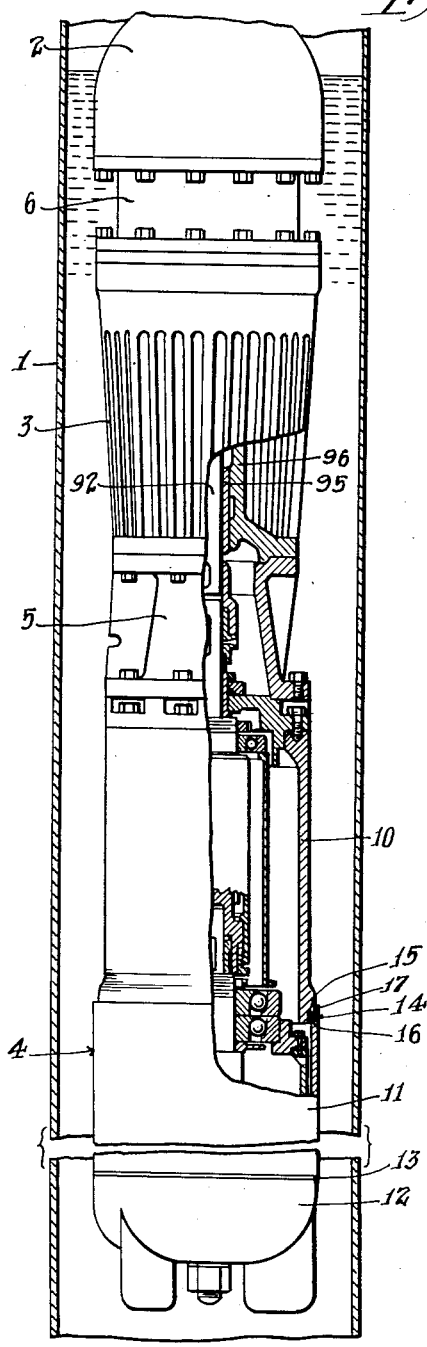
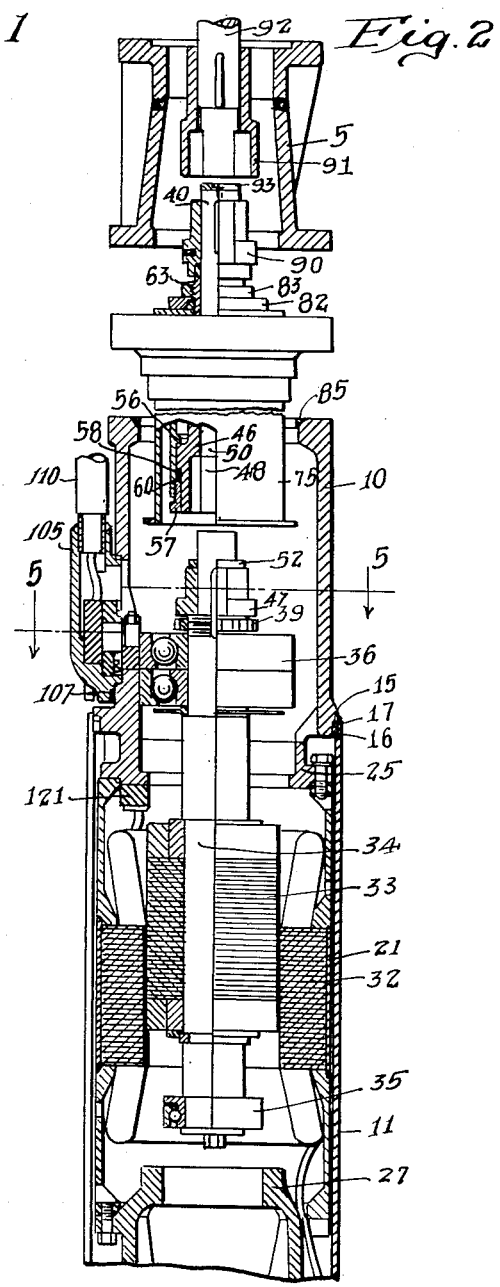
Inventors
Aladar Hollander
Vaino A. Hoover
BY
Lyon & Lyon ATTORNEYS Sept. 5, 1939.   A. HOLLANDER ET AL   2,171,749
SUBMERSIBLE MOTOR ASSEMBLY
Filed Dec. 8, 1937   2 Sheets-Sheet 2
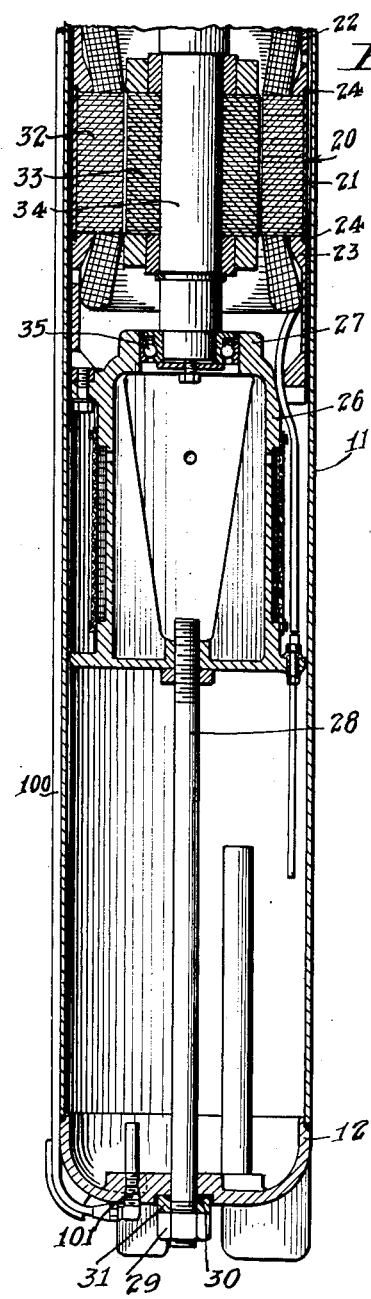
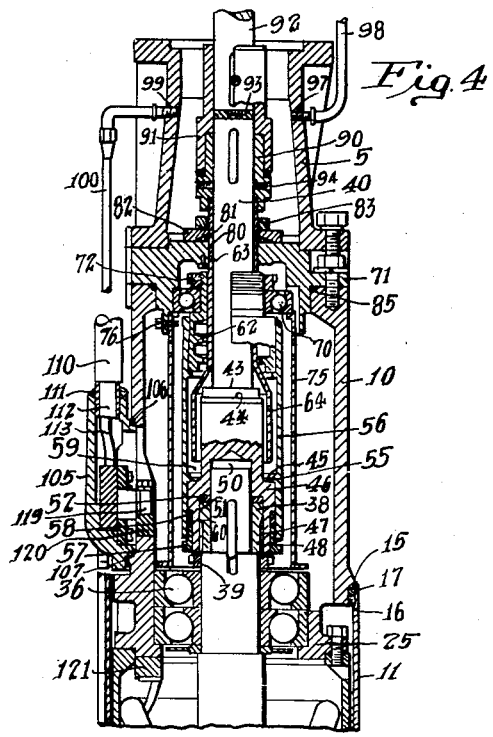
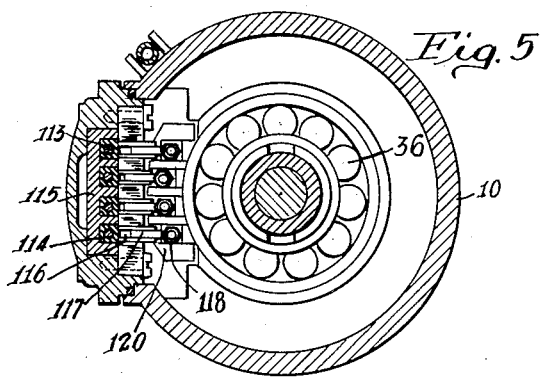
Inventors
Aladar Hollander
Vaino A. Hoover
By Lyon & Lyon
ATTORNEYS.

Patented Sept. 5, 1939

2,171,749

UNITED STATES PATENT OFFICE 2,171,749

SUBMERSIBLE MOTOR ASSEMBLY

Aladar Hollander and Vaino A. Hoover, Los Angeles, Calif., assignors to Byron Jackson Co., Huntington Park, Calif., a corporation of Delaware Application December 8, 1937, Serial No. 178,741

16 Claims. (Cl. 172—36)

This invention relates, in general, to a submersible motor assembly, and more particularly to improvements in a submersible motor assembly particularly adapted for use in a motor-pump unit consisting primarily of a rotary pump and an electric motor suspended below the pump in axial alinement therewith and submerged in the liquid being pumped. The rotor shaft of the motor extends through the motor housing and is exposed to the well liquid, giving rise to the necessity of completely sealing off the interior of the motor casing around the motor shaft. A liquid seal has been found to be very effective for this purpose.

A principal object of this invention is to provide an improved motor assembly including a motor having a rotor shaft, a removable seal assembly disposed within the motor housing and embodying a separate shaft section detachably coupled at one end to the rotor shaft, and adapted to be coupled at its other end to a driven element, such as a pump shaft.

A further object is the provision, in such an assembly, of an arrangement whereby the three above-mentioned shafts may be operatively connected together solely by bringing the respective ends of the shafts together, without the necessity of providing access to the shaft couplings.

The motor of a motorpump unit of the aforementioned type is encased in a fluid-tight housing isolating the motor from the well fluid. Of necessity, the housing consists of a plurality of sections connected together in fluid-tight relation. In prior devices of this type, it has been necessary to separate the housing sections, breaking the seals therebetween, in order to remove the rotor assembly. The invention aims to avoid the necessity of separating the housing sections under such circumstances, by so arranging the rotor assembly and seal assembly in relation to the stationary parts of the motor that the two assemblies may be removed bodily in succession from the housing without disturbing the stationary parts, and by breaking only a single seal at the juncture of the upper end of the motor housing with the next superposed part.

As stated previously, the provision of a perfect seal about the shaft protruding from the fluid-tight housing is of the utmost importance. A salient feature of this invention is the provision of a seal assembly of novel design and a minimum of parts, being so constructed as to be capable of assembly into a complete unit prior to insertion into the motor housing.

These and other objects will be fully understood from the following description, taken in conjunction with the accompanying drawings, wherein Fig. 1 is a view of a motorpump unit suspended in a well and embodying the novel motor assembly;

Fig. 2 is a view of the motor assembly, partly in section and partly in elevation, showing the manner in which the motor assembly and seal assembly are inserted or removed as units successively through the open end of the motor housing;

Fig. 3 is a longitudinal sectional view through the lower portion of the motor assembly;

Fig. 4 is a longitudinal sectional view through the upper portion of the motor assembly, this figure being a continuation of Fig. 3; and Fig. 5 is a sectional view, taken on the line 5—5 of Fig. 2, with the seal assembly removed.

Referring to the drawing, Fig. 1 discloses a motorpump unit suspended within a well casing 1 and immersed in the well fluid. The unit comprises generally a pump 2, a strainer 3, and an electric motor 4, connected in axial alinement and suspended from the lower end of a discharge column (not shown), leading from the upper end of the pump to the well surface. Interposed between the strainer and the motor is an adapter 5 and a combined suction piece and adapter 6 connects the strainer to the pump.

The motor is enclosed within a housing comprising an upper section 10, an intermediate section 11, and a lower bowl-shaped end section 12. The latter is permanently joined to the intermediate section at 13, as by welding, and a fluid-tight joint indicated generally at 14 forms a seal between the sections 10 and 11. The joint 14 comprises a gasket 15 volumetrically confined within an annular recess formed between a shoulder recess in the periphery of the housing section 10, a gasket ring 16 seating on a shoulder on housing section 11, and an upwardly extending lip 17 on the latter.

As shown in Figs. 3 and 4, the stator frame 20, comprising a stator shell 21 and upper and lower end rings 22 and 23 welded thereto at 24, is bolted or otherwise rigidly secured to an upper bearing bracket 25 formed integral with the lower end of the upper housing section 10. A member 26 is secured to the lower end of end ring 23, and has formed integral therewith at its upper end a lower bearing bracket 27. Threadedly connected to the lower end of member 26 is an elongated stud 28 extending through the lower motor housing section 12 and having a nut 29 threaded on its lower end. The motor housing sections 11 and 12 are thus clamped between the nut 29 and the upper housing section 10. The stud 28 is sealed in fluid-tight relation to the lower section 12 by a gasket 30 confined within a recess formed in a gasket ring 31 interposed between the nut 29 and the housing. By tightening the nut the gaskets 30 and 15 are compressed, forming fluid-tight seals between stud 28 and housing section 12, and between housing sections 10 and 11.

The motor 4 consists of a stator 32 and a rotor 33, the rotor-shaft 34 being provided with a lower radial bearing 35 supported in lower bearing bracket 27, and with an upper combined radial and thrust bearing 36 supported in upper bearing bracket 25 and secured in assembled relation with the shaft 34 by a clamping nut 39. The rotor shaft extends only a short distance above the upper bearing, and is provided with a reduced end portion to which is keyed a coupling member 38 forming one-half of a jaw coupling connecting the rotor shaft in driving relation with an intermediate shaft section 40, which for convenience will be termed the seal shaft.

As shown most clearly in Fig. 4, the lower end of the seal shaft 40 is enlarged by steps forming shoulders 43, 44, and 45. The shoulders 43 and 44 are for a particular purpose in connection with the mercury seal, which is described in detail and claimed in our copending application Serial No. 178,739, filed December 8, 1937. The shoulder 45 is formed on the upper end of a coupling member 46 forming the other half of the shaft coupling, the coupling members 38 and 46 having interengaging jaws 47 and 48, respectively, constituting a jaw coupling. It will be noted that the coupling member 46 is formed as an integral part of the seal shaft 40, the latter being bored axially at 50 to receive the upper end of the rotor shaft 34, and being counterbored at 51 to receive the coupling member 38. A thrust washer 52 is interposed between the end of the coupling member 38 and the base of the counterbore 51, to receive and transmit axial thrust from the shaft 40 to the shaft 34. By the selection of a washer of proper thickness, any slight variations in overall length of the seal assembly may be compensated for while providing for proper axial engagement of the shafts, whereby axial thrust produced by the pump is transmitted to the thrust bearing 36.

The shoulder 45 on shaft 40 is machined to form a seat for an annular flange 55, formed on the inner periphery of a seal housing shell 56. A clamping nut 57 rigidly secures the shell to the shaft 40 with flange 55 abutting the shoulder 45, whereby the shell is caused to rotate in coaxial relation to the shaft. A gasket 58 seals the shell in fluid-tight relation to the shaft, thus forming an annular channel 59 adapted to contain a heavy sealing liquid, such as mercury. The gasket 58 is confined within an annular channel between the shell 56 and the coupling member 46, and is compressed by a gasket ring 60 engaged by the clamping nut 57. Secured to the upper end of shell 56, as by welding, is a seal bearing mount 62 which is spaced from the shaft 40 to accommodate the upper cylindrical portion 63 of a seal baffle having a lower enlarged portion 64 extending downwardly into the annular mercury channel 59.

The seal bearing mount 62 is rotatably mounted in an antifriction bearing 70 supported in a flange 71 bolted to the upper end of the upper motor housing section 10. By this arrangement the seal shaft 40 is in effect journaled in bearing 70 through the intermediacy of the seal housing shell 56 rigidly secured to the shaft. A clamping nut 72 secures the bearing 70 and the bearing mount 62 in assembled relation. It will be observed that the seal assembly is firmly supported between the coupling member 38 at its lower end and the bearing 70 at its upper end.

Extending axially the entire length of the seal housing shell 56 and spaced radially outwardly thereof, is a seal guard 75, secured to flange 71 as by screws 76. It will be understood that the motor housing is filled with a dielectric liquid, such as oil, and were it not for the seal guard, the rotation of the housing shell 56 would induce rotation of all of the oil in the region thereof. Any irregularities on the inner surface of the housing 10, such as are shown on the left side in Fig. 4, would create turbulence in the oil. The guard 75 provides a cylindrical wall spaced only a slight distance from the rotating shell 56, thus eliminating turbulence and confining the induced rotation of the oil to a small amount immediately adjacent the shell 56.

The cylindrical neck portion 63 of the seal baffle extends upwardly through an opening 80 in the flange 71, and is sealed thereto by a gasket 81 confined in a recess in a gasket ring 82 clamped between flange 71 and a nut 83 threaded on the upper end of the baffle 63. The flange 71 is sealed to the upper end of upper motor housing section 10 by a gasket 85. Both the gaskets 81 and 85 are conformable to the shape of their respective recesses, providing a tight seal while at the same time permitting metal-to-metal contact of the parts sealed. The importance of a metal-to-metal contact, as distinguished from a joint employing a gasket interposed between the flanges, will be appreciated when it is realized that the flange 71 centers the seal shell 56 in coaxial relation to the rotor shaft and with a close running clearance between the bearing mount 62 and the baffle 63, and that the baffle 63 is spaced only slightly from the shaft 40. Also, the flange 71 centers the shaft 40, through the intermediacy of the shell 56 and bearing mount 62, and it is important that the shaft be properly alined with the adjacent ends of the rotor and pump shafts. It is only by metal-to-metal contact between the parts that accurate alinement of the rotating parts can be obtained.

Keyed to the upper end of seal shaft 40 is a coupling member 90 cooperating with a complementary coupling member 91 keyed to the lower end of pump shaft 92 to transmit rotation to the impeller of the pump 2. A thrust washer 93 is interposed between the adjacent ends of the shafts 40 and 92, the thickness of the washer being such that axial thrust of the pump is transmitted to the seal shaft 40 and thence through thrust washer 52 to the rotor shaft and to the thrust bearing 36, while at the same time proper axial adjustment of the pump impeller may be effected by using a washer 93 of proper thickness. A mercury filler opening 94 is provided in the coupling member 90, communicating with the annular space between the shaft 40 and the upper cylindrical portion 63 of the baffle, which in turn leads to the mercury channel 59. The opening 94 is closed by a plug after the mercury is added.

As shown in Fig. 1, the lower end of pump shaft 92 is journaled in a sleeve bearing 95 supported in a hub portion 96 formed integral with the strainer 3. It is thus seen that in addition to the support afforded shaft 40 by the bearing 70 through the seal housing 56, the shaft 40 is also maintained in alinement by the couplings at each end, both the rotor shaft and the pump shaft being journaled in bearings closely adjacent the couplings.

The adapter 5 is split in an axial plane, the two halves being bolted together and separately secured to the motor casing 10 and superposed strainer 3, whereby one-half may be removed to provide access to the coupling and mercury filler opening 94. The adapter is provided with a threaded opening 97 to which is secured a vent tube 98 which communicates with the well fluid, and a second opening 99 in the adapter receives the upper end of a balance tube 100 connected at 101 to the lower end of the motor casing. By this arrangement, the internal and external pressures are balanced, and the interior of the adapter 5 serves as a quiescent zone interposed in the communicating passage.

Referring to Figs. 4 and 5, a terminal box 105 is secured in fluid-tight relation to an opening 106 formed in the upper housing section 10. A gasket 107, of deformable material, is volumetrically confined within a recess formed by opposing faces on the inner periphery of the terminal box and on the housing 10. When bolted to the housing, the terminal box seals the opening therein, and provides a connection between electrical conductors inside and outside the motor casing. A polyphase conductor cable 110 (Fig. 4) extends from the well surface to the terminal box, and is connected thereto by a wiped metallic joint 111 between the lead sheath 112 of the cable and the terminal box. The conductors 113 embedded in the cable extend into the terminal box and terminate within connector pieces 114 mounted in slots formed in a supporting and insulating bracket 115. Forked contacts 116 projecting from the connector pieces engage corresponding knife blade contacts 117 mounted on copper studs 118 extending through the bearing bracket 25 and insulated therefrom. In order to insure proper alinement of the knife blade contacts, and to facilitate assembly thereof in the restricted space available, the contacts are rigidly attached to or integral with sleeves 119 which are bored to a tight sliding fit on the upper ends of the studs 118, the sleeves being of square or other non-circular outer contour. A Bakelite plate 120 provided with vertical slots conforming to the shape of the sleeves maintains the studs in alinement and also supports the sleeves and knife-blade contacts in properly oriented position. A lower plate 121 is permanently attached to the motor winding terminals, and is bored to receive the lower headed ends of the studs 118. The construction described forms a very compact and rigid terminal assembly, capable of being assembled with ease. The studs are inserted through the lower plate 121 and through the openings provided therefor in the bearing bracket 25; the upper slotted plate 120 is then slipped over the upstanding ends of the studs, the sleeves 119 slipped over the studs and inserted in the slots in the plate 120, and the assembly is secured together by bolts on the upper ends of the studs.

Reference to Fig. 5 will disclose the arcuate alinement of the terminals, occupying the annular space between the outer periphery of the bearing 36 and the housing 10. No portion of the connections extends inwardly of the outer periphery of the bearing, thus making it possible to insert the bearing and the other elements of the rotor assembly through the upper end of the housing after the electrical connections have been made up, and enabling withdrawal of the rotor assembly without disturbing the electrical connections.

From the foregoing description, it will be apparent that a motor and seal assembly has been provided which has many advantages over submersible motor assemblies used heretofore. The provision for removal of the seal assembly and the motor assembly in succession through the upper end of the housing, requiring breaking only one seal, is an important advantage, not only from the standpoint of time required, but also because it reduces the possibility of the motor not being completely sealed when reassembled. Furthermore, the motor housing need not be drained of the oil with which it is filled, in order to remove the rotor and seal assemblies, thus effecting a saving in oil and in the time required to refill the housing.

Another distinct advantage in the construction described lies in the arrangement whereby the rotor and seal shaft sections may be assembled in operative relation without requiring access to the couplings. In assembling the motor, each unit may be assembled individually, with its bearings properly adjusted as indicated in Fig. 2. The rotor assembly is then inserted endwise into the motor housing until the upper bearing 36 seats on the bearing bracket 25. The seal assembly is then inserted as a unit into the housing, the coupling members 38 and 46 interengaging and connecting the shafts 34 and 40 in driving relation. It will be noted in this connection that the bearing 70, flange 71, gasket ring 82, nut 83, and upper coupling member 90 may be assembled with the seal prior to its insertion in the motor housing. As the coupling member 46 engages its complementary member 38, the flange 71 seats on the upper flange of the motor housing, and when bolted thereto the gasket 85 completes the sealing of the motor. The adapter 5 may then be bolted to the flange 71, and the pump connected to the upper end of the adapter, the coupling members 90 and 91 interengaging and connecting seal shaft 40 and pump shaft 92 in driving relation. As stated previously, removal of one half of the split adapter provides access to the coupling and the mercury filler opening. To remove the seal and rotor assemblies, the reverse operations are performed. Fig. 2 illustrates the manner in which the individual units may be assembled and then inserted in the motor housing in succession.

The novel seal assembly also has many advantages which will be obvious to those skilled in the art. By the provision of a bearing at the upper end of the seal, the clearances between the shaft 40 and the baffle 63 and between the baffle and the bearing mount 62 may be reduced to a minimum, since the latter is mounted directly on the inner race of the bearing, and the shaft is rigidly supported through its connection to the seal housing 56, at the lower end of the seal. By forming the coupling member 46 integral with the shaft and directly at the base of the seal, the upper end of the coupling member also serves as the base of the annular mercury channel, thus reducing the number of individual parts. The seal between the baffle 63 and the closure flange 71 when once made up need not be broken when the seal assembly is removed from the motor housing, since the flange 71 forms in effect a part of the seal assembly. The ease of removal of the seal assembly will be further appreciated when it is considered that while the seal may be filled with mercury after inserted in the housing, it is impossible to drain the mercury therefrom solely through the filler opening. Tilting of the seal to a horizontal position allows the mercury to escape into the interior of the motor with the consequent danger of short circuiting the electrical connections. The ready removability of the seal assembly after removal of the upper motor housing flange 71 thus lessens the danger of loss of mercury into the interior of the motor housing.

We claim:

1. In a submersible electric motor assembly, an elongated fluid-tight housing having an open end, a closure member detachably secured to said open end in fluid-tight relation thereto, an electric motor comprising a stator and a rotor assembly mounted in said housing, said rotor assembly comprising a rotor and a rotor shaft, a seal assembly mounted in said housing between said motor and the open end of said housing, said seal assembly comprising a shaft operatively connected to said rotor shaft, and sealing means between said seal shaft and said closure member, said seal shaft being adapted to be operatively connected to a driven element.

2. A submersible motor assembly as defined in claim 1, in which said rotor assembly includes a bearing adjacent each end of said rotor shaft, said rotor assembly being insertible and removable as a unit through the open end of said housing.

3. A submersible motor assembly as defined in claim 1, in which said rotor assembly and said seal assembly are insertible and removable as units successively through the open end of said housing.

4. A submersible motor assembly as defined in claim 1, in which said rotor assembly and said seal assembly are insertible and removable as units successively through the open end of said housing, driving relation between said rotor shaft and said seal shaft being established by axial engagement of said shafts.

5. A submersible motor assembly as defined in claim 1, in which said rotor assembly includes a bearing adjacent each end of said rotor shaft, said innermost bearing being of less diameter than said stator and both bearings being of less diameter than said open end of said housing, whereby said rotor assembly is insertible and removable as a unit through the open end of said housing.

6. A submersible motor assembly as defined in claim 1, in which said sealing means comprises a stationary member secured in fluid-tight relation to said closure member and a rotatable member secured to said seal shaft, and bearing means between said rotatable member and said housing.

7. In a submersible motor assembly, a motor including a vertical rotor shaft, a seal assembly including a seal shaft disposed in axial alinement with said rotor shaft and a liquid seal about said seal shaft, said liquid seal including walls defining an annular channel closed at the lower end, complementary coupling members on said rotor shaft and said seal shaft and operatively connecting said shafts, said seal shaft coupling member forming the closed end of said channel.

8. A submersible motor assembly as defined in claim 7, in which said seal shaft coupling member is formed integral with said seal shaft, said shaft having a shoulder at the juncture of said shaft and said coupling member, said shoulder forming the closed end wall of said channel.

9. In a submersible motor assembly a fluid-tight housing having an open end, a closure member detachably secured to said open end in fluid-tight relation thereto, a motor mounted in said housing and a vertical shaft driven by said motor and projecting through said closure member, a seal assembly including wall means defining an annular channel surrounding said shaft and closed at the lower end for containing a sealing liquid, said wall means including a sleeve rigidly supported at the lower end with respect to said shaft in spaced coaxial relation thereto, said shaft and said sleeve defining inner and outer walls, respectively, of said annular channel, and bearing means rotatably supporting the upper end of said sleeve in said closure member.

10. A submersible motor assembly comprising a motor, vertical shafting driven thereby, a seal assembly including walls defining an annular channel about a portion of said shafting, said channel being closed at the lower end to form a liquid receptacle, a shaft coupling on the upper end of said shafting, and a liquid filler opening extending through said coupling and communicating with said channel.

11. A submersible motor assembly comprising a fluid-tight housing adapted to be submerged in liquid, an electric motor disposed in said housing, shafting driven by said motor and extending through said housing, sealing means between said shafting and said housing, said housing being substantially filled with a dielectric liquid and said sealing means separating said dielectric liquid from the external liquid, said sealing means including a substantially cylindrical member rotatable in the dielectric liquid in said housing, and a stationary substantially cylindrical guard disposed in relatively closely spaced coaxial relation to said rotatable member and substantially coextensive therewith, whereby rotation of the dielectric liquid induced by rotation of the rotatable member is confined by said guard to that portion of the liquid between the rotatable member and the guard.

12. In a submersible electric motor assembly, an elongated fluid-tight housing having an open end, a closure member detachably secured to said open end in fluid-tight relation thereto, an electric motor mounted in said housing and comprising a stator and a rotor assembly, a seal assembly mounted in said housing between said motor and the open end of said housing, said seal assembly and rotor assembly being of smaller diameter than said open end whereby they are insertible and removable as units successively through the open end of said housing, electric power connections from an external source to said motor, said connections comprising a conductor exterior of said housing and extending into said housing in fluid-tight relation thereto and terminating between said motor and the open end of said housing, a second conductor extending from said motor to said first-named conductor and operatively connected thereto, said power connections being wholly disposed at a distance from the rotor axis greater than the maximum radius of said rotor assembly, whereby the latter may be inserted or removed through the open end of said housing without disturbing said power connections.

13. In a submersible motor assembly, a motor and a vertical shaft driven thereby, a seal assembly comprising said shaft, and a rotatable member secured to said shaft at its lower end for containing a sealing liquid, a stationary member extending into said sealing liquid, bearing means for said shaft between said seal assembly and said motor, and bearing means for affording support to said rotatable member independently of the support afforded thereto by said shaft.

14. A submersible motor assembly as defined in claim 1, in which said sealing means comprises a stationary member secured in fluid-tight relation to said closure member, and a rotatable member secured to said seal shaft, and bearing means between said rotatable member and said closure member.

15. In a submersible electric motor assembly, an elongated fluid-tight housing having an open end, a closure member detachably secured to said open end in fluid-tight relation thereto, an electric motor comprising a stator and a rotor assembly mounted in said housing, said rotor assembly comprising a rotor and a rotor shaft, a seal assembly mounted in said housing between said motor and the open end of said housing, said seal assembly comprising a shaft disposed in axial alinement with said rotor shaft and operatively connected thereto, and sealing means between said seal shaft and said closure member, said seal shaft being adapted to be operatively connected to a driven element.

16. In a submersible motor assembly, a motor and a vertical shaft driven thereby, an enlargement integral with said shaft providing an upwardly facing shoulder, a sleeve surrounding a portion of said shaft and having a downwardly facing shoulder seating on said first named shoulder, said sleeve and shaft defining a chamber for sealing liquid, compressible packing sealing the junction of said sleeve and shaft enlargement, and a single adjustable element operatively engaging said packing and said sleeve for compressing said packing and simultaneously clamping said shoulders together.

ALADAR HOLLANDER.
VAINO A. HOOVER.